United States Patent [19]

Mori et al.

[11] 4,354,267
[45] Oct. 12, 1982

[54] DATA TRANSMISSION SYSTEM UTILIZING LOOP TRANSMISSION LINES BETWEEN TERMINAL UNITS

[75] Inventors: Kinji Mori, Sagamihara; Hirokazu Ihara; Makoto Nohmi, both of Machida, all of Japan

[73] Assignee: Hitachi, Ltd., Tokyo, Japan

[21] Appl. No.: 149,632

[22] Filed: May 14, 1980

[30] Foreign Application Priority Data

Sep. 10, 1979 [JP] Japan .................................. 54-115300

[51] Int. Cl.³ .......................... G06F 11/20; H04J 3/14
[52] U.S. Cl. .................................... 371/11; 340/825.01
[58] Field of Search .................. 371/11, 9, 22; 370/16; 340/147 SC

[56] References Cited

U.S. PATENT DOCUMENTS

| | | | |
|---|---|---|---|
| Re. 28,958 | 9/1976 | Zafiropulo et al. | 371/11 X |
| 3,652,798 | 3/1972 | McNeilly et al. | 371/11 X |
| 4,048,446 | 9/1977 | Hafner et al. | 370/16 |
| 4,159,470 | 6/1979 | Strojny et al. | 340/147 SC |

*Primary Examiner*—David H. Malzahn
*Attorney, Agent, or Firm*—Antonelli, Terry & Wands

[57] ABSTRACT

There is disclosed a data transmission system comprising a first and a second loop transmission line for transferring data in its clockwise and counterclockwise directions, respectively. In each loop transmission line a plurality of transmission control units are connected in series. Further, a plurality of terminal units each are interconnected with its associated first and second transmission control units correspondingly and respectively located in the first and second loop transmission lines. Each of the transmission control units in the first loop transmission line is interconnected to a corresponding one of the transmission control units in the second loop transmission line by a bypass line so as to make a pair, so that a fault in the loop transmission line may be detected and a loop transmission line bypassing the fault point may be established without using any master transmission control unit.

8 Claims, 6 Drawing Figures

DATA TRANSMISSION SYSTEM UTILIZING LOOP TRANSMISSION LINES BETWEEN TERMINAL UNITS

BACKGROUND OF THE INVENTION

The present invention relates to a data transmission system used for transmission of a message among a plurality of terminal units through a loop transmission line.

In a conventional transmission system including a loop transmission line, in order to determine the time required for transmission and reception of a message at each of a plurality of transmission control units connected in a loop and carry out countermeasures for a partial fault of the loop, one of the transmission control units is assigned to a master transmission control unit while the others are assigned to slave transmission control units. The master transmission control unit monitors a transmission status of the entire loop to determine the transmission and reception timing and to execute the countermeasures for the fault of the loop. As a result, a large-size master transmission control unit is required, and when the master transmission control unit is out of order, the operation of the transmission system is completely stopped.

SUMMARY OF THE INVENTION

Accordingly, it is an object of the present invention to provide a data transmission system which can detect a fault in a loop transmission line and establish a transmission line which bypasses the fault point, without using any master transmission control unit.

In order to attain the above objects, in accordance with the present invention, there is provided a data transmission system which comprises: a first loop transmission line for transferring data in a first direction, a second loop transmission line for transferring data in a second direction which is opposite to the first direction, a plurality of first transmission control units connected in the first loop transmission line, a plurality of second transmission control units connected in the second loop transmission line, a plurality of bypass lines each coupling one of the first transmission control units to one of the second transmission control units so as to make a pair and for transferring data bidirectionally therebetween, and a plurality of terminal units for exchanging data to each other through the first and second loop transmission lines, each of the terminal units being connected to corresponding pair of the first and second transmission control units, the first and second transmission control units each including: first interface means for transferring and receiving data to and from its associated loop transmission line, second interface means for transferring and receiving data to and from its associated bypass line, and third interface means for transferring and receiving data to and from its associated terminal units, and a data processing means for receiving data from the first, second and third interface means and for selectively sending out the received data to said first, second and third interface means.

DETAILED DESCRIPTION OF THE PREFERRED EMBODIMENT

The present invention will now be explained with reference to the preferred embodiment thereof.

Figure 1:
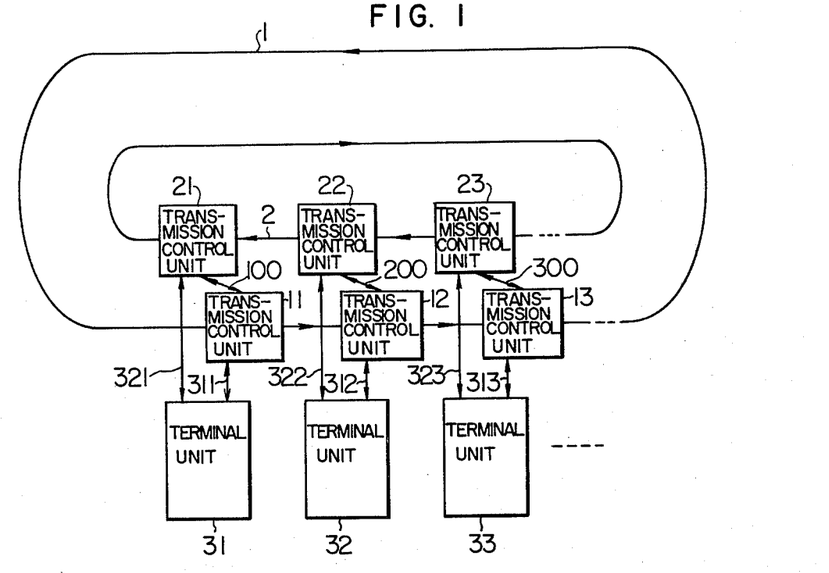
FIG. 1 shows a schematic block diagram of a loop transmission system in accordance with the present invention.

A data transmission system shown in FIG. 1 includes a loop transmission line 1 for transmitting a message in a counterclockwise direction and a loop transmission line 2 for transmitting a message in a clockwise direction. Connected in the loop transmission line 1 are transmission control units 11, 12 and 13 while connected in the loop transmission line 2 are transmission control units 21, 22 and 23 which are paired with the transmission control units 11, 12 and 13, correspondingly and respectively. The pairs of the transmission control units 11 and 21, 12 and 22, and 13 and 23 are connected through bypass lines 100, 200 and 300, correspondingly and respectively, which are capable of transmitting message bidirectionally, and also connected to transmission-reception terminal units 31, 32 and 33, respectively, through lines 311 and 321, 312 and 322, and 313 and 323, respectively, which are capable of transmitting a message bidirectionally. When the transmission control units 11, 12 and 13, the loop transmission line 1, the transmission control units 21, 22 and 23 and the loop transmission line 2 are in normal condition, the transmission-reception terminal units 31, 32 and 33 mutually exchange a message through either the transmission control units 11, 12 and 13 and the closed loop transmission line 1 or the transmission control units 21, 22 and 23 and the loop transmission line 2. If a fault occurs in those transmission control units or loop transmission lines, for example, if a fault occurs in one of the transmission control units 11, 12 and 13 and the loop transmission line 1, the terminal units 31, 32 and 33 exchange a message through normally operating units of the transmission control units 11, 12 and 13 and the portion in normal condition of the loop transmission line 1, and through the transmission control units 21, 22 and 23, the bypass lines 100, 200 and 300 and the loop transmission line 2. When a fault occurs in any one of the transmission control units 21, 22 and 23 and the loop transmission line 2, the terminal units 31, 32 and 33 exchange a message in a similar manner.

Accordingly, the transmission control units 11, 12 and 13 each have a function to transmit a message on the loop transmission line 1 and receive a message from the loop transmission line 1 in a normal condition and function to transmit a message to the bypass line 100, 200 or 300, respectively, and receive a message therefrom when there is an abnormality in the data transmission system of the loop transmission line 1. The transmission control units 21, 22 and 23 each have the same functions as described above.

Figure 2:
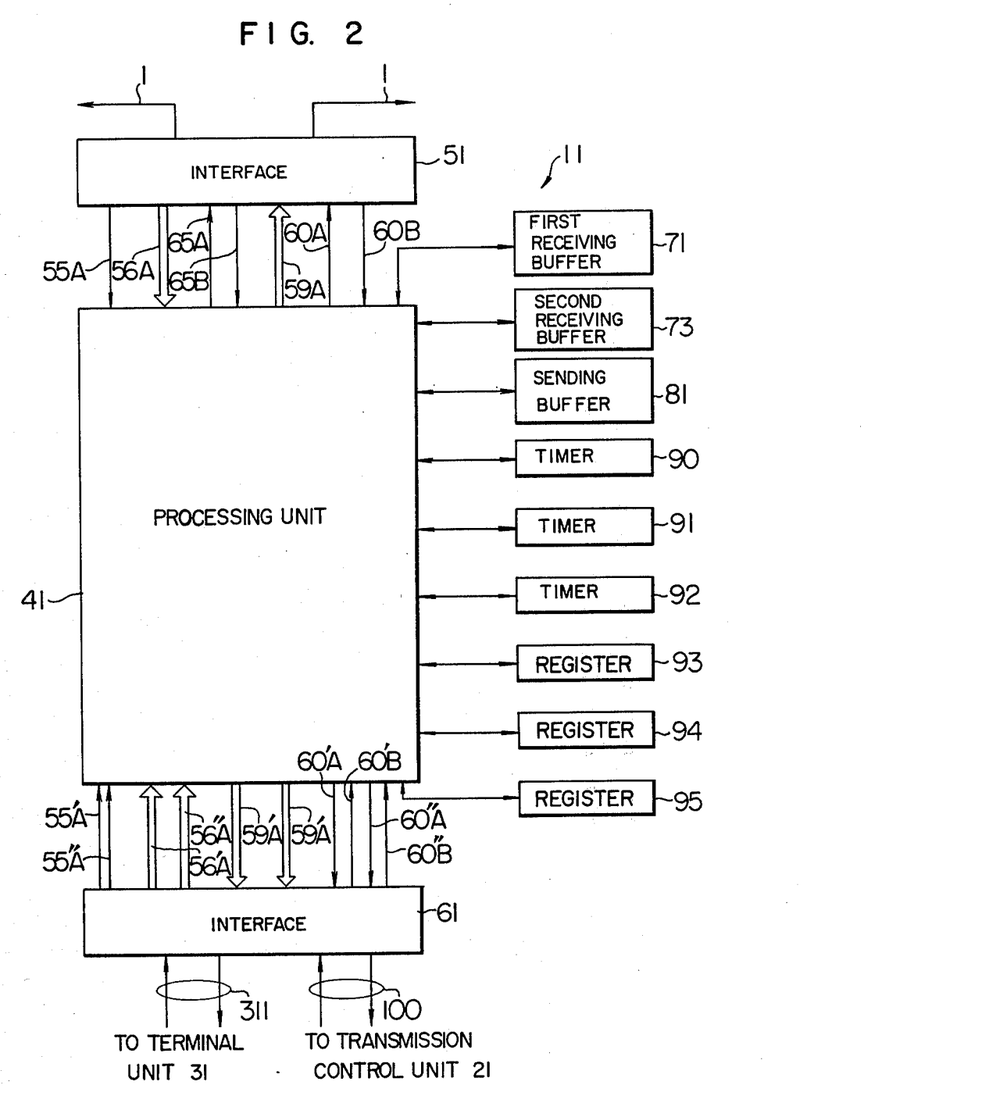
FIG. 2 shows a more detailed block diagram of a transmission control unit used in the loop transmission system of FIG. 1.

FIG. 2 shows a block diagram of an internal circuit of the transmission control unit 11. The other transmission control units each have the same structure. The transmission control unit 11 comprises an interface 51 for exchanging a message with the loop transmission line 1, an interface 61 for exchanging a message with terminal unit 31 through the bypass line 100 and the line 311, the first and second receiving buffers 71 and 73 for storing messages received through the interfaces 51 and 61, respectively, a sending buffer 81 for storing a message to be sent through the interfaces 51 and 61, a processing unit 41 for controlling the transmission and reception of messages, timers 90 to 92 and registers 93 to 95. The other portions of the transmission control unit 11 than the interfaces 51 and 61 can be implemented by a microcomputer.

Figure 3:
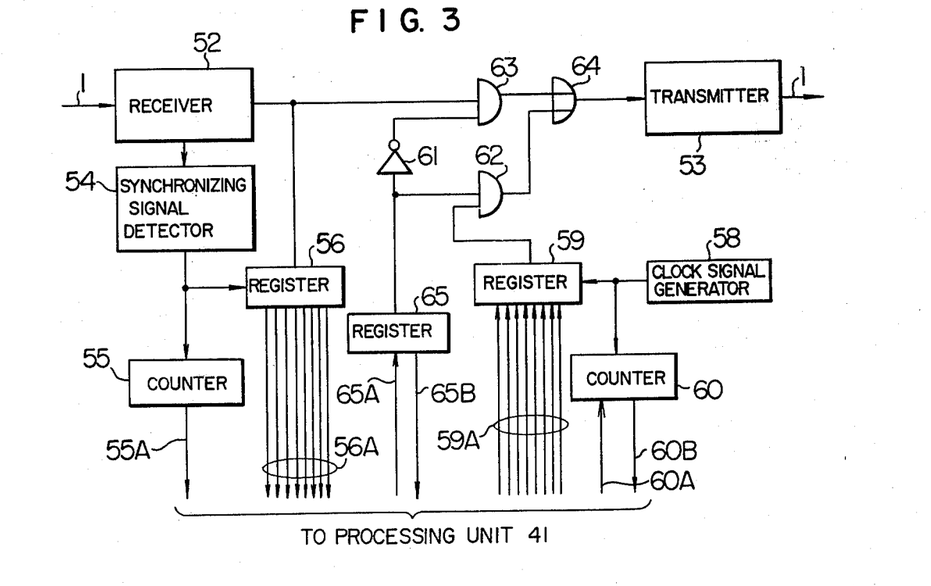
FIGS. 3 and 4 show more detailed block diagrams of interfaces 51 and 61, respectively.
Figure 4:
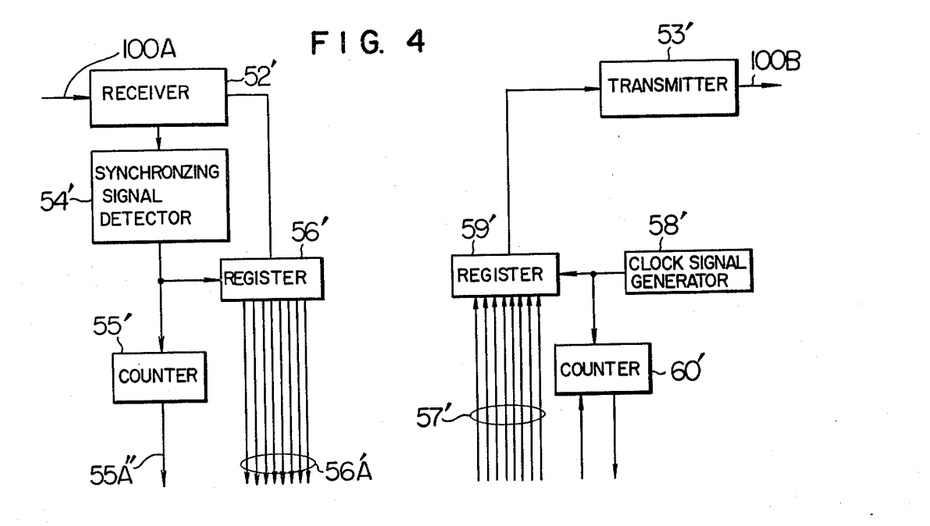

FIG. 3 shows a detailed block diagram of the interface 51, and FIG. 4 shows a detailed block diagram of the portions of the interface 61 which are connected to the bypass line 100. Those portions of the interface 61 which are connected to the line 311, are not shown because they are identical to those shown in FIG. 3. The primed reference numerals in FIG. 4 represent the like elements designated by the same reference numerals in FIG. 3. Those portions of the interface 61 which are connected to the line 311 will be referred to by the same reference numerals as those used in FIG. 3 but with double prime (") marks.

The circuit of FIG. 4 differs from that of FIG. 3 only in that the former does not include the gates 61 to 64 and the register 65.

Referring to FIGS. 2 to 4, the operation of the transmission control unit 11 will be described below.

When there is no abnormality in the transmission system of the loop transmission line 1, "Os" are stored in the registers 93 to 95 as will be described later. In this case, the unit 11 transmits data from the terminal unit 31 to another terminal unit e.g. the terminal unit 33 in the following manner.

Figure 5:
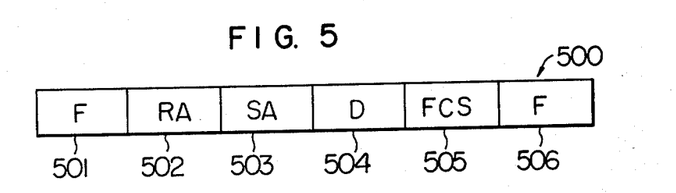
FIG. 5 shows a format of a message to be transmitted.

The data to be sent is transmitted in the form of a message as shown in FIG. 5, in which message 500 comprises a flag field (F) 501 indicating the beginning of the message, a receiving address field (RA) 502 which contains addresses for specifying a receiving transmission control unit, a sending address field (SA) 503 which contains addresses for identifying a message sending transmission control unit, a field (D) 504 which contains data to be transmitted, a message error detection bit field (FCS) 505 and a flag field (F) 506 for indicating the end of the message.

The data to be transmitted is received by the processing unit 41 from the terminal unit 31 through the interface 61 and stored in the sending buffer 81 in a form of a message under the control of the processing unit 41.

The message are stored in the sending buffer 81 together with data representing the number of times of the transmission. This number is "0" in this case where the data has been received from the terminal unit 31 and has not yet been transmitted.

The processing unit 41 searches, at a self-determined time, point the first and second receiving buffers 71 and 73 and the sending buffer 81 for any message to be transmitted stored therein. In this instance, the message to be transmitted is detected at the sending buffer 81 and the processing unit 41 sets "1" in the register 65 in the interface 51 through a line 65A to indicate a transmission status and loads the leading eight bits of the message to be transmitted into the register 59 in the interface 51 through a line 59A, and also resets the counter 60 through a line 60A.

The eight-bit data in the register 59 is serially read out in response to clock signals from a clock signal generator 58. The AND gate 62 is in its open state because the output of the register 65 is "1". Accordingly, the output of the register 59 is sent to a transmitter 53 through the AND gate 62 and the OR gate 64 onto the loop transmission line 1. No input is present to the other input terminal of the OR gate 64 because the AND gate 63 is closed by the "0" output of the inverter 61. The counter 60 is a three-bit counter which is counted up by the output of the clock signal generator 58. When it counts up eight bits of clock signal, it produces an overflow signal on a line 60B. The processing unit 41 responds to the overflow signal and sends to register 59 the next eight bits of the message to be transmitted stored in the sending buffer 81. This operation is repeated to send out a predetermined length of message to the loop transmission line 1. When the transmission of the message to be transmitted stored in the sending buffer has been completed, the number of times of transmission is set to "1" and the register 65 is reset to "0". The control unit 41 also presets a value which is somewhat larger than a time value required for the message to circulate around the loop transmission line 1, into the timer 90.

When the message sent out of the transmission control unit 11 reaches a receiver 52 in the transmission control unit 12, a synchronizing signal detector 54 detects the bit sequence of the received message and produces synchronizing signals which are in synchronism with the bits of the bit sequence. The message received by the receiver 52 is stored in the eight-bit register 56 in synchronism with the synchronizing signals. The counter 55 is a three-bit counter which produces an overflow signal on a line 55A when it counts up eight synchronizing signals. The processing unit 41 in the transmission control unit 12 responds to the overflow signal and transfers the message stored in the register 56 into the first receiving buffer 71.

If the transmission control unit 12 is not transmitting a message at this time, the register 65 has stored "0" therein. Accordingly, the AND gate 63 is in its open state and the received message is sent to the transmitter 53 through the AND gate 63 and the OR gate 64 and then transferred to the loop transmission line 1.

When the processing unit 41 receives the message, it checks the receiving address in the received message in order to decode if the sending address is its own address. If it is not, the processing unit 41 continues to receive the data eight bits at a time. Since the received message has already been transferred to the loop transmission line 1, the processing unit 41 need not transfer the message again to the loop transmission line 1. In order to indicate that there is no need for transfer, the content of the register 65 is read out onto the line 65B and stored into the first receiving buffer 71 as the data accompanying the received message. When the sending address is detected to be its own address, the processing unit 41 sets the register 65 to "1" through the line 65A to stop the transfer of the remaining portion of the message from the receiver 52 to the transmitter 53 and stores the remaining portion of the message in the first receiving buffer 71. When the processing unit 41 determines the completion of the reception of a full text of message by decoding the flag field 506 (see FIG. 5), it again sets the register 65 to "0".

If the transmission control unit 12 is transmitting a message, the register 65 has stored "1" therein. Accordingly, the message received by the receiver 52 is not sent to the transmitter 53 but it is stored in the first receiving buffer 71.

If the sending address of the received message is not its own address, the message must be transferred again onto the loop transmission line 1. In order to indicate the need of the transfer, the content "1" of the register 65 is stored in the first receiving buffer 71.

When the transmission control unit 12 receives the message, it decodes if the receiving address of the message in the first receiving buffer 71 is its own address. If it is its own address, the message is sent to the terminal unit 32 and the message stored in the first receiving buffer 71 is cleared. On the other hand, if the receiving address of the message is not its own address as in the case of the present instance, the message is sent out again onto the loop transmission line 1 at a self-determined transmission point of time provided that the bit accompanying the message for indicating the need or no need of the transmission is "1", and the message stored in the first receiving buffer 71 is cleared. If that bit is "0", the message is not sent out and the message stored in the first receiving buffer 71 is cleared. When the message sent out onto the loop transmission line 1 reaches the interface 51 of the unit 13, it is stored in the first receiving buffer 71 in the transmission control unit 13 in the same manner as described in conjunction with the transmission control unit 12, and the receiving address is checked by the processing unit 41. If it is determined that the message is to be sent to the terminal unit 33, as is the case of the present instance, the processing unit 41 sends the message stored in the first receiving buffer 71, at a self-determined point of time, to the terminal unit 33 and the loop transmission line 1 through interfaces 61 and 51, respectively. In this manner, the data is transmitted from the terminal unit 11 to the terminal unit 33 and the message is transferred to the loop transmission line 1. The message sent out of the transmission control unit 13 to the loop transmission line 1 moves along the loop transmission line 1 and reaches the transmission control unit 11, which in turn receives the message through the interface 51 and stores it in the first receiving buffer 71. When the transmission control unit 11 determines that the sending address in the message stored in the first receiving buffer 71 is its own address, the messages in the first receiving buffer 71 and the messages in sending buffer 81 are cleared and the message is not transferred to the loop transmission line 1. The processing unit 41 resets the timer 90.

If the message does not return to the transmission control unit 11 for some reason, the timer 90 runs out. The processing unit 41 responds to the time-run-out signal from the timer 90 and transfers again the previously transmitted message which has been stored in the sending buffer 81, to the loop transmission line 1. Each time the retransmission occurs, the count indicating the number of times of the transmission accompanying with the message and stored in the sending buffer 81 is counted up. The retransmission repeats by a predetermined number of times unless the message transmitted by the transmission control unit 11 is received by the transmission control unit 11 within a predetermined turn-around time.

Figure 6:
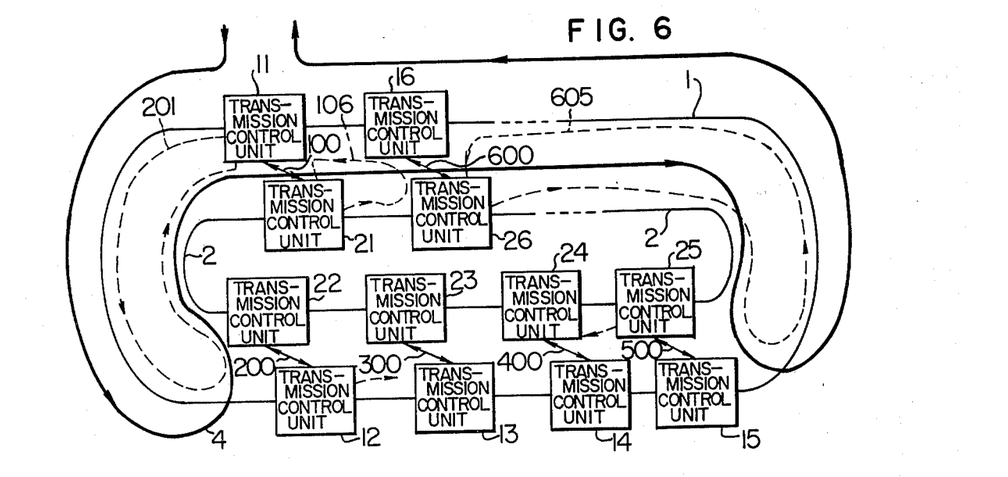
FIG. 6 illustrates a process for establishing a bypass route when a fault occurs in the system of FIG. 1.

If it is determined after the transmission control unit 11 has repeatedly transmitted the same message a predetermined number of times, that the message is not returned to the transmission control unit 11 through the loop transmission line 1 by the overcount of the number of times of transmission, stored in the sending buffer 81, beyond the predetermined count, the processing unit 41 determines that the loop transmission line 1 is in abnormal condition and it initiates the processing for establishing a bypass line. This processing will be explained with reference to FIG. 6 in which the same numerals as those in FIG. 1 designate like elements. The system shown in FIG. 6 has additional transmission control units 14, 15 and 16; and 24, 25 and 26 and bypass lines 400, 500 and 600 in addition to the elements shown in FIG. 1. The additional element each have the same construction as the corresponding one in FIG. 1. In FIG. 6, the transmission/reception terminal units connected to the transmission control units 11 and 21, 12 and 22, 13 and 23, 14 and 24, 15 and 25, and 16 and 26, respectively, are not shown for the purpose of simplification.

When the transmission control unit 11 detects the abnormality of the loop transmission system, it sets the register 93 to "1" to indicate that the processing unit 41 has received a request for checking the acknowledgement or non-acknowledgement of transmission and sends onto the loop transmission line 1 a first message including a transmission acknowledgement/non-acknowledgement check command, a receiving address for specifying the adjacent transmission control unit 12 on the loop transmission line 1 and a sending address consisting of the address of the transmission control unit 11. It simultaneously sends onto the bypass line 100 a second message including a receiving address for specifying the transmission control unit 21, a transmission acknowledgement/non-acknowledgement check command and a sending address consisting of the address of its own. Further, the transmission control unit 11 presets the timer to a time value which is somewhat larger than the time value required for the message to turn around a minor loop 201 including the transmission control units 11, 12, 22 and 21.

The transmission control unit 12, when it is specified by the first message, receives the first message in the first receiving buffer 71, and the processing unit 41, when it determines that the receiving address is its own address, decodes the command and the sending address in the first message. When it decodes that the command is the transmission acknowledgement/non-acknowledgement check command and the sending address is not its own address, the processing unit 41 in the transmission control unit 12 sends to transmission control unit 22 through the bypass line 200 a message including the receiving address for specifying the transmission control unit 22, the transmitted command and the sending address. When the transmission control unit 22 detects that the message has been applied to the interface 61 from the bypass line 200, the processing unit 41 responds thereto and transfers the message received from the bypass line 200 into the second receiving buffer 73. When it detects that the receiving address in the stored message is its own address and the command in the message is the transmission acknowledgement/non-acknowledgement check command and the sending address is not its own address, it alters the receiving address in the message to the address specifying the transmission control unit 21 and sends the altered message onto the loop transmission line 2. When this message arrives at the transmission control unit 21 along the loop transmission line 2, the transmission control unit 21 stores the message into the first receiving buffer 71 through the interface 51. The processing unit 41, when it detects that the receiving address in that message is its own address and the command in that message is the transmission acknowledgement/non-acknowledgement check command and the sending address is not its own address, sends that message to the bypass line 100 through the interface 61. The transmission control unit 11, when it detects that the message has been received from the bypass line 100, stores that message into the second receiving buffer 73. It detects that the receiving address in that message is its own address and decodes the command and the sending address in the transmitted message and determines that the sending address is its own address and that the minor loop 201 including the transmission control units 11, 12, 22 and 21 is in normal condition. Thereafter, the transmission control unit 11 resets the timer 91 and set the register 94 to "1" to indicate the completion of the transmission acknowledgement/non-acknowledgement check. The content of the register 95, that is, "0" is kept unchanged to indicate that the loop transmission line 1 is available.

On the other hand, when the transmission control unit 21 receives the second message sent from the transmission control unit 11 onto the bypass line 100, the processing unit 41 in the transmission control unit 21 stores the second message into the second receiving buffer 73. When the processing unit 41 detects that the receiving address in that message is its own address, it decodes the command and the sending address in that message. If it is decoded that the command is the transmission acknowledgement/non-acknowledgement check command and the message has been transmitted from the transmission control unit 11 which is paired with the transmission control unit 21 on the loop transmission line other than the loop transmission line 2 to which the transmission control unit 21 is connected, the processing unit 41 sets the register 93 to "1" to indicates that the transmission acknowledgement/non-acknowledgement check command has been received and sends to transmission control unit 26 through the loop transmission line 2 a message including the sending its own address, the receiving address specifying the transmission control unit 26 and the transmission acknowledgement/non-acknowledgement check command. Furthermore, the processing unit presets the timer 91 to a time value which is somewhat larger than the time value required for the message to turn around a minor loop 106 connecting the transmission control units 21, 26, 16 and 11. The transmission control units 26, 16 and 11 carry out the same processes as those described in connection with the transmission control units 12, 22 and 21. That is, when the minor loop 106 is in normal condition, the transmission control unit 21 stores a message including the receiving and sending its own addresses and the transmission acknowledgement/non-acknowledgement check command, from the bypass line 100, and the transmission control unit 21 decodes that message and determines that the minor loop 106 is in normal condition and the bypass line 100 need not be used. The content of the register 95, that is, "0" is kept unchanged to indicate the above condition and the register 94 is set to "1" to indicate the completion of the transmission acknowledgement/non-acknowledgement check. The timer 91 is reset.

This completes the transmission acknowledgement/non-acknowledgement check of the minor loops 201 and 106.

Regarding the transmission acknowledgement/non-acknowledgement check of the minor loop 106, when that transmission control unit 26 of the group of transmission control units 26, 16 and 11 contributing to the message transfer which is on the loop shared with the transmission control unit 21 which issued the transmission acknowledgement/non-acknowledgement check command, receives the message containing the transmission acknowledgement/non-acknowledgement check command, the unit 26 sets the register 93 to "1" to indicate the above condition.

Regarding the transmission acknowledgement/non-acknowledgement check of the minor loop 201, that transmission control unit 12 of the group of transmission control units 12, 22 and 21 contributing to the message transmission which is on the loop shared with the transmission control unit 11 which issued the message containing the transmission acknowledgement/non-acknowledgement check command, sets the register 93 to "1".

As a result of the above operation, the registers 93 of the transmission control units 12 and 26 store "1's" while the registers 94 do not store "1's". When "1" is stored in the register 93 and not stored in the register 94, the associated unit sends the message containing the transmission acknowledgement/non-acknowledgement check command from its own unit.

The transmission control unit 26 checks the transmission acknowledgement/non-acknowledgement of the minor loop 605 connecting the transmission control units 26, 25, 15 and 16 in the same manner as the transmission control unit 21 does, and if it determines that the transmission is acknowledged, it sets the register 94 to "1" while maintaining the register 95 in "0" state.

The transmission control unit 12 also checks the transmission acknowledgement/non-acknowledgement of the minor loop connecting the transmission control units 12, 13, 23 and 22 in the same manner as the transmission control units 21 and 26 do. In this case, if the transmission control unit 13 is in a fault state, the message containing the transmission acknowledgement/non-acknowledgement check command issued from the transmission control unit 12 does not return to the transmission control unit 12 when the timer 91 runs out. The unit 12 then repeatedly sends the message containing the transmission acknowledgement/non-acknowledgement check command a predetermined number of times, and if it still cannot detect that the loop is acknowledged for the transmission it sets the register 94 to "1" to indicate the completion of the transmission acknowledgement/non-acknowledgement check and also sets the register 95 to "1" to indicate that the minor loop is in abnormal condition and the bypass line 200 should be used.

The transmission control unit 25, when it receives the message containing the transmission acknowledgement/non-acknowledgement check command from the transmission control unit 26, checks itself for the transmission acknowledgement/non-acknowledgement.

In the instance of FIG. 6, the unit 25 sets the register 95 to "1" to indicate that the transmission control unit 24 is in fault state and the bypass line 500 should be used.

In this manner, each transmission control unit checks the content of the register 95 to determine if the bypass line is to be used or not. In the instance of FIG. 6, the transmission control units 12 and 25 determine that the associated bypass line should be used. In this manner, when the register 95 is set to "1", the associated unit sets the register 65 to "1" and transfers the message received from the loop transmission line 1 or 2 into the first receiving buffer 71 and then transfers that message to the bypass line 200 or 500, respectively. On the other hand, the transmission control units 22 and 15 transfer the messages received from the bypass line into their second receiving buffers 73, and if the messages stored in the second receiving buffers 73 does not contain the sending addresses they transfer those messages to the loop transmission line 2 or 1, respectively. If they are their own, they do not transfer them. In any case, the contents of the second receiving buffers 73 are then cleared. As a result, the message received by the transmission control unit 12 is transferred to the loop transmission line 2 through the bypass line 200 and the transmission control unit 22 and then it is received by the transmission control unit 25, which in turn may transfer the message to the loop transmission line 1 through the bypass line 500 and the transmission control unit 15. In this manner, a closed transmission path shown by a thick line 4 in FIG. 6 is established.

In the operation described above, the transmission control unit which has accepted the transmission acknowledgement/non-acknowledgement check request and sent the transmission acknowledgement/non-acknowledgement check command from itself, presets its timer 92 at the time of transmission to a time value which is somewhat larger than the time value required for the transmission acknowledgement/non-acknowledgement check command to turn around the normal loop 1 or 2. When each transmission control unit receives the message containing the transmission acknowledgement/non-acknowledgement check command from the adjacent transmission control unit sharing the same loop before the timer 92 runs out, it does not send the message containing the transmission acknowledgement/non-acknowledgement check command from itself. In this manner, the transmission acknowledgement/non-acknowledgement check operation is prevented from being repeated indefinitely when the loop transmission line 1 has been temporarily in abnormal condition and then restores to a normal state.

That transmission control unit 12 of the group of transmission control units 12 and 25 having their registers 95 set to "1" which is on the loop transmission line 1 periodically sends the message containing a loop fault recovery check command to the loop transmission line 1. Both the sending address and the receiving address of the message are its own addresses. When the other transmission control unit 13 is in normal condition, it receives that message, retransmits the message onto the loop transmission line 1, and does not sent it to the bypass line 300. Since the succeeding transmission control units 14, 15, 16 and 11 are in normal condition, the message returns to the transmission control unit 12 and the transmission control unit 12 resets all the registers 93 to 95 to "0". However, if the transmission control unit 13 has not recovered from the fault state, the message containing the fault recovery check command does not return to the transmission control unit 12. Thus, the abnormality of the loop transmission line 1 is determined and the registers 93 to 95 are left unchanged. The transmission control unit 12 then periodically sends the message containing the transmission acknowledgement/non-acknowledgement check command to the loop including the transmission control units 13, 23, 22 and 12, and if all the transmission control units 13, 23 and 22 are in normal condition, it resets the register 95 to "0".

The above is the system operation in the case where the transmission control unit connected to the loop transmission line 1 has detected the abnormality in the transmission system of the loop transmission line 1.

However, a similar operation will be carried out in the case where the transmission control unit connected to the loop detects the abnormality in the transmission system of the loop transmission line 2.

As described above, the transmission control units on the loop transmission lines 1 and 2, respectively, each sends the message including the transmission acknowledgement/non-acknowledgement check command for the minor loop from itself. When each of the transmission control units on the loop transmission lines 1 and 2 receives the message containing the transmission acknowledgement/non-acknowledgement check command, it transfers that message and also sends the transmission acknowledgement/non-acknowledgement check command from itself to check the transmission acknowledgement/non-acknowledgement for the minor loop starting from itself. In this manner, by checking the transmission acknowledgement/non-acknowledgement of a portion of the loop transmission lines 1 and 2 by the transmission control units, the bypass line can be established without requiring a master station even when a portion of the loop transmission lines 1 and 2 is in the fault state.

In order to attain the object of the present invention of transmitting message utilizing the bypass line, it is not necessary that the transmission control units 21 to 23 connected to the loop transmission line 2 are connected to the corresponding terminal units. In such a case, those transmission control units do not need the circuits for exchanging data with the terminal units, e.g. a portion of the interface 61 and the sending buffer.

We claim:

1. A data transmission system comprising:
   a first loop transmission line for transferring data in a first direction;
   a second loop transmission line for transferring data in a second direction which is opposite to said first direction;
   a plurality of first transmission control units connected in said first loop transmission line;
   a plurality of second transmission control units connected in said second loop transmission line;
   a plurality of bypass lines each coupling one of said first transmission control units to one of said second transmission control units so as to form a pair and for transferring data bidirectionally therebetween; and
   a plurality of terminal units for exchanging data with each other through said first and second loop transmission lines, each of said terminal units being connected to a corresponding pair of said first and second transmission control units,
   said first and second transmission control units each including:
   first interface means for transferring and receiving data to and from its associated loop transmission line,
   second interface means for transferring and receiving data to and from its associated bypass line,
   third interface means for transferring and receiving data to and from its associated terminal unit, and
   data processing means for receiving data from said first, second and third interface means and for selectively sending out the received data to said first, second and third interface means.

2. A data transmission system according to claim 1, wherein
   each of said first and second transmission control units comprises:

first buffer means for storing data received from said first interface means;

second buffer means for storing data received from said second interface means;

third buffer means for storing data received from said third interface means; and first register means for storing a signal indicating the existence of an abnormality in a minor loop including two adjacent pairs of transmission control units, one pair of which includes the transmission control unit itself and the other of which includes a transmission control unit adjacent to said transmission control unit itself downstream on its associated loop transmission line, said data processing means connected with said first, second and third buffer means for transferring data received from one of said first, second and third interface means to a corresponding one of said first, second and third buffer means to be stored therein, and for reading out from said first, second and third buffer means data stored therein to transfer the read-out data to a corresponding one of said first and second interface means in accordance with the status of said first register means.

3. A data transmission system according to claim 2, wherein each of said first and second transmission control units further comprises:

first timer means for detecting the time-run-out of a first predetermined time period, said first timer means being actuated by said data processing means when the data stored in said third buffer means is sent out from the transmission control unit to its associated loop transmission line, said first timer means being halted by said data processing means when said data sent out is received by said transmission control unit after circulation around said associated loop transmission line; and first counter means for counting the number of repetition times of data sending, the contents of said first counter means being incremented when said data processing means sends out previous data stored in said third buffer means in response to the time-run-out detection of said first timer means, said data processing means connected with said first counter means for sending out a first check message stored in said data processing means thereof to said associated loop transmission line through said first interface means and a second check message stored in said data processing means thereof to its associated bypass line through said second interface means when the contents of said first counter means becomes a predetermined value which indicates an abnormality in the associated loop transmission line, each of said first and second check message comprising a sending address field for indicating the address of a transmission control unit which generates the check message and a check command field for indicating that this message is to be transferred in a minor loop including two adjacent pairs of transmission control units, one pair of which includes the transmission control unit generating the check message.

4. A data transmission system according to claim 3, wherein each of said first and second transmission control units further comprises:

second register means for storing a flag signal which indicates that the transmission control unit itself is required to check the abnormality of a minor loop including an adjacent two pairs of transmission control units, one pair of which includes the transmission control unit itself, the other pair of which includes a transmission control unit adjacent to said transmission control unit itself downstream on its associated loop transmission line;

second timer means for detecting the time-run-out of a second predetermined time period which is long enough for the first transmission check message to circulate around the minor loop; and second counter means for counting the number of repetition times of sending the first check message, said data processing means connected with said second register means for setting said second register means with the flag signal when said transmission control unit receives the first check message from a transmission control unit adjacent upstream of its associated loop transmission line or when said transmission control unit receives the second check message from its paired transmission control units to send out another first check message which includes the address of the transmission control unit itself in the sending address field thereof to its associated loop transmission line through said first interface means, and connected with said second counter means and said second timer means for incrementing the contents of said second counter means and actuating said second timer means which is halted by said data processing means when said first check message is received by said transmission control unit after circulation around the minor loop, for repeating the sending out of the first check message from itself and the incrementation of said second counter means every time when said second timer means detects the time-run-out of said second predetermined time period, and for setting a signal for indicating the existence of an abnormality to said first register means when the contents of said second counter means becomes a predetermined value.

5. A data transmission system comprising:

a first loop transmission line for transferring data in a first direction;

a second loop transmission line for transferring data in a second direction which is opposite to said first direction;

a plurality of first transmission control units connected in said first loop transmission line;

a plurality of second transmission control units connected in said second loop transmission line;

a plurality of bypass lines each coupling one of said first transmission control units to one of said second transmission control units so as to form a pair and for transferring data bidirectionally therebetween; and a plurality of terminal units for exchanging data with each other through said first and second loop transmission lines, each of said terminal units being connected to a corresponding one of said first transmission control units, said first transmission control units each including:

first interface means for transferring and receiving data to and from its associated loop transmission line, second interface means for transferring and receiving data to and from its associated bypass line, third interface means for transferring and receiving data to and from its associated terminal unit, and data processing means for receiving data from said first, second and third interface means and for selectively sending out the received data to said first, second and third interface means, said second transmission control units each including:

first interface means for transferring and receiving data to and from its associated loop transmission line, second interface means for transferring and receiving data to and from its associated bypass line, and data processing means for receiving data from the first and second interface means of said second transmission control unit and for selectively sending out the received data to the first and second interface means of said second transmission control unit.

6. A data transmission system according to claim 5, wherein each of said first transmission control units comprises:

first buffer means for storing data received from the first interface means of said first transmission control unit;

second buffer means for storing data received from the second interface means of said first transmission control unit;

third buffer means for storing data received from the third interface means of said first transmission control unit; and first register means for storing a signal indicating the existence of an abnormality in a minor loop including two adjacent pairs of transmission control units, one pair of which includes the transmission control unit itself and the other of which includes a transmission control unit adjacent to said transmission control unit itself downstream on its associated loop transmission line, the data processing means of said first transmission control unit being connected with the first, second and third buffer means of said first transmission control unit for transferring data received from one of said first, second and third interface means to a corresponding one of the first, second and third buffer means of said first transmission control unit to be stored therein, and for reading out from the first, second and third buffer means data stored therein to transfer the read-out data to a corresponding one of the first and second interface means of said first transmission control unit in accordance with the status of said first register means, and wherein each of said second transmission control units comprises:

first buffer means for storing data received from the first interface means of said second transmission control unit;

second buffer means for storing data received from the second interface means of said second transmission control unit; and first register means for storing a signal indicating the existence of an abnormality in a minor loop including two adjacent pairs of transmission control units, one pair of which includes the transmission control unit itself and the other of which includes a transmission control unit adjacent to said transmission control unit itself downstream on its associated loop transmission line, the data processing means of said second transmission control unit being connected with the first and second buffer means of said second transmission control unit for transferring data received from one of the first and second interface means of said second transmission control unit to a corresponding one of the first and second buffer means of said second transmission control unit to be stored therein, and for reading out from the first and second buffer means of said second transmission control unit data stored therein to transfer the read-out data to a corresponding one of the first and second interface means of said second transmission control unit in accordance with the status of the first register means of said second transmission control unit.

7. A data transmission system according to claim 6, wherein each of said first transmission control units further comprises:

first timer means for detecting the time-run-out of a first predetermined time period, said first timer means being actuated by said data processing means of said first transmission control unit when the data stored in said third buffer means of said first transmission control unit is sent out from the transmission control unit to its associated loop transmission line, the first timer means of said first transmission control unit being halted by said data processing means of said first transmission control unit when the data sent out above is received by said transmission control unit after circulation around said associated loop transmission line; and first counter means for counting the number of repetition times of data sending, the contents of said first counter means of said first transmission control unit being incremented when said data processing means of said first transmission control unit sends out previous data stored in said third buffer means of said first transmission control unit in response to the time-run-out detection of said first timer means of said first transmission control unit, the data processing means of said first transmission control unit being connected with first counter means for sending out a first check message stored in said data processing means thereof to said associated loop transmission line through the first interface means of said first transmission control unit and a second check message stored in said data processing means thereof to its associated bypass line through the second interface means of said first transmission control unit when the contents of the first counter means of said first transmission control unit becomes a predetermined value which indicates an abnormality in the associated loop transmission line; and each of said first and second check message comprising a sending address field for indicating the address of a transmission control unit which generates the check message and a check command field for indicating that this message is to be transferred in a minor loop including two adjacent pairs of transmission control units, one pair of which includes the transmission control unit generating the check message.

8. A data transmission system according to claim 7, wherein each of said first transmission control units further comprises:

a second register means for storing a flag signal which indicates that the first transmission control unit itself is required to check the abnormality of a minor loop including an adjacent two pairs of transmission control units, one pair of which includes the transmission control unit itself, the other pair of which includes a transmission control unit adjacent to said transmission control unit itself downstream on its associated transmission line;

a second timer means for detecting the time-run-out of a second predetermined time period which is long enough for the first transmission check message to circulate around the minor loop; and a second counter means for counting the number of repetition times of sending the first check message, the data processing means of said first transmission control unit being connected with the second register means of said first transmission control unit for setting said second register means with the flag signal when said first transmission control unit receives the first check message from a transmission control unit adjacent upstream on its associated loop transmission line or when said first transmission control unit receives the second check message from its paired transmission control units, for sending out another first check message which includes the address of the first transmission control unit itself in sending an address field thereof to its associated loop transmission line through the first interface means of said first transmission control unit, and for incrementing the contents of the second counter means of said first transmission control unit and actuating the second timer means of said first transmission control unit which is halted by the data processing means of said first transmission control unit when the first check message is received by said first transmission control unit after circulation around the minor loop, said data processing means of said first transmission control unit also being connected with the second counter means of said first transmission control unit for repeating the sending out of the first check message and the incrementation of said second counter means every time when the second timer means of said first transmission control unit detects the time-run-out of said second predetermined time period, and said data processing means of said first transmission control unit also being connected with the first register means of said first transmission control unit for setting a signal for indicating the existence of an abnormality to said register means thereof when the contents of the second counter means of said first transmission control unit becomes a predetermined value.

* * * * *